United States Patent [19]

Vitale

[11] 4,209,675
[45] Jun. 24, 1980

[54] VARIABLE DURATION ELECTRIC CLOCK TIMER UNIT

[76] Inventor: Andrew P. Vitale, P.O. Box 6231, Grand Rapids, Mich. 49506

[21] Appl. No.: 858,260

[22] Filed: Dec. 7, 1977

[51] Int. Cl.² .................. H01H 43/00; H05B 1/02
[52] U.S. Cl. .................. 200/33 R; 200/36; 200/38 DA; 219/203; 219/493; 368/252
[58] Field of Search .............. 219/202, 203, 492, 493; 58/19 R, 19 A, 19 B; 200/36, 37 R, 33.2, 38 D, 38 DA, 38 R, 38 A, 37 A, 56 R

[56] References Cited

U.S. PATENT DOCUMENTS

| 318,612 | 5/1885 | Gallet | 200/36 X |
|---|---|---|---|
| 693,647 | 2/1902 | Hirschfield | 200/36 X |
| 1,311,424 | 7/1919 | Spargo | 59/19 A |
| 1,521,600 | 1/1925 | Crowe | 58/19 A |
| 1,797,072 | 3/1931 | Caraba | 200/36 |
| 2,076,733 | 4/1937 | Lawrence | 58/19 A |
| 2,742,540 | 4/1956 | Whitlock | 200/33.2 |
| 3,221,138 | 11/1965 | Hercher | 219/202 X |
| 3,594,547 | 7/1971 | Quinn | 219/202 X |

FOREIGN PATENT DOCUMENTS

| 681135 | 1/1930 | France | 200/36 |
|---|---|---|---|
| 309220 | 6/1933 | Italy | 200/36 |
| 42365 | 9/1914 | Sweden | 200/36 |

Primary Examiner—Anthony Bartis
Attorney, Agent, or Firm—Howard I. Podell

[57] ABSTRACT

A variable duration clock timer unit which may be adjustably set to energize an electrical circuit for a selected duration for each period of clock operation includes a momentary contact, normally open, switch frictionally mounted at a selected location in a concentric annular groove in a circular clock face below a rotatable clock arm driven by an electric clock motor. The clock arm is adjustable in length and has a free end in the shape of a triangle overlying the annular groove. The switch actuator may be depressed by engagement with the free end of the clock arm to close the switch for the period of time that the free end is in engagement with the switch actuator. Adjustment of the length of the clock arm changes the width of the free end portion of the clock arm engageable with the switch actuator and thus determines the duration of switch closing. The timer unit may be used to automatically control the operation of an electric defrosting circuit of a motor vehicle.

2 Claims, 6 Drawing Figures

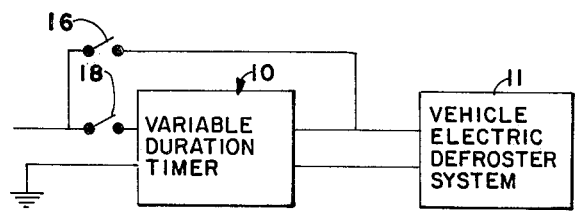
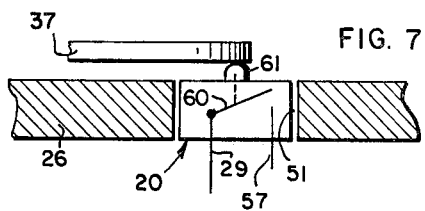
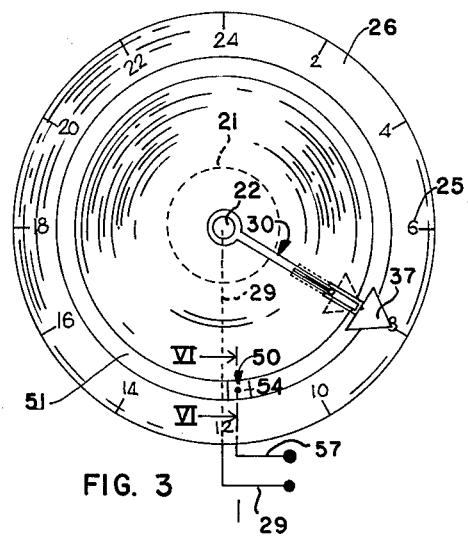
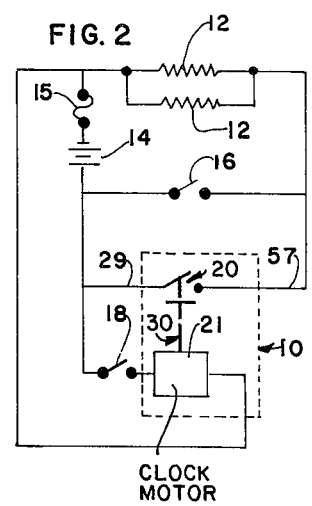
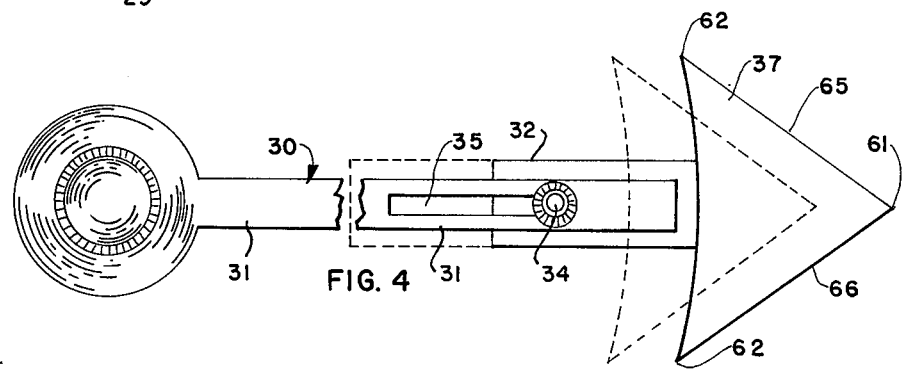
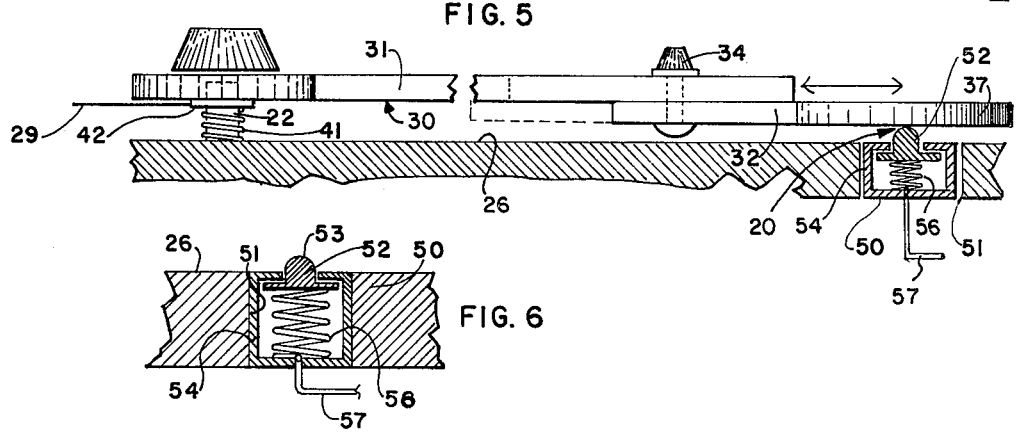

VARIABLE DURATION ELECTRIC CLOCK TIMER UNIT

SUMMARY OF THE INVENTION

My invention is a timer for actuating the defrosting circuit of the windows of a vehicle which includes a clock for setting the automatic actuation of the defrosting circuit and an adjustable rotatable clock arm that adjusts the duration of the ON period of the timer. The clock arm is of adjustable length with the free end of the arm shaped as a triangle. A momentary contact normally open switch is frictionally mounted, at a selected location in concentric annular groove in a circular clock face that lies below the clock arm and the switch is located so that the switch actuator may be depressed by engagement with the free end of the clock arm so as to close the switch for the period of time that the arm is in engagement with the switch actuator. Adjustment of the radial length of the clock arm adjusts the time period of each cycle that the arm tip is in engagement with the switch actuator.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a block diagram of the invention in use;

FIG. 2 is a schematic diagram of the circuitry of the invention;

FIG. 3 is a plan view of the timer unit;

FIG. 4 is a plan view of the clock arm;

FIG. 5 is a side view of the clock arm taken on the line V—V of FIG. 4;

FIG. 6 is a sectional view of the fixed contact; and

FIG. 7 is a sectional view of the clock face with an alternative switch arrangement in the form of a monentary contact electric switch

DESCRIPTION OF THE PREFERRED EMBODIMENT

Turning now descriptively to the drawings, in which similar reference characters denote similar elements throughout the several views, FIGS. 1-2 illustrate the use of the timer 10 to control electrical defrosting circuitry 11 of a vehicle, with the defrosting circuitry 11 consisting of electrical resistance heating elements 12 mounted or embedded in a window panel of the vehicle, which resistance elements are heated by the passage of electricity.

As shown in FIG. 2, a battery 14 is connected through a fuse 15 and a manual operated switch 16 to the resistance elements 12 in conventional fashion for manual control.

A switch unit 20 actuated by a clock arm 30 driven by a clock motor 21 in timer 10 is connected in parallel to manual switch 16. The electrically energized clock motor 21 is connected by manual switch 18 to battery 14.

Clock motor 21 rotates output shaft 22 which is frictionally engaged to clock arm 30, with clock motor 21 rotating arm 30 at the rate of one complete turn, in the preferred embodiment, every twenty-four hours for defrosting the windows of a parked car. Shorter cycle times of the timer 10 may be obtained using alternate clock motors. Arm 30 may be manually rotated relative to shaft 22 to set it in position with relation to time indicia 25 marked on the periphery of the clock face 26. Arm 30 is formed of a radial member 31 telescopically joined to a pointer member 32 by means of a threaded bolt 34 that fastens pointer member 32 through a radial slot 35 in radial member 31, so as to permit adjustment of the radial length of the triangular tip section 37 at the free end of the pointer member 32. Both members 31 and 32 of arm 30 are formed of conductive material so that arm 30 serves as a pole of switch 20. A fixed wire 29 that leads from battery 14 is maintained in commutating contact with radial member 31 by means of a coil spring 41 mounted about shaft 22 and which bears against a washer 42 mounted on shaft 22 and to which wire 29 is fixed, with washer 42 bearing against the underside of the radial arm 31 to maintain electrical contact.

A fixed contact unit 50 is frictionally engaged in an annular groove 51 of the clock face 26, with contact unit 50 comprising a metal contact 52 fitted with a rounded external projecting surface 53 enclosed in a housing 54 snugly engaged in groove 51. A compression spring 56 of metal biases contact 52 in the extended position with spring 56 electrically connected to a wire 57 leading to the load defrosting resistors 12 so that contact unit 50 serves as the fixed pole contact of switch 20.

Pointer member 32 is formed with a triangular shaped tip section 37, oriented so that one point 61 of tip section 37 extends radially away from arm 30, with the other two points 62 of tip section 37 located at equal radial distances from the center of drive shaft 22. Preferably points 62 are spaced apart by the peripheral distance that clock arm 30 rotates in a period of one hour. Arm 30 may be adjusted in length so that a portion of tip section 37 is in electrical contact with detent 52 at least once for every period of rotation of arm 30 and for a duration dependent upon the radial length of arm 30 and the consequent length of the arc between the adjoining sides 65 and 66 of tip section 37 at the radial distance of contact detent 52 from the center of drive shaft 22.

Alternatively, contact assembly 50 may be replaced by a momentary normally open switch to obviate the need for conducting electricity through arm 30, with said switch serving as switch 20 of FIG. 2 as shown in FIG. 7. The poles of normally open switch 20 are connected respectively to leads 29 and 57, with the switch frictionally positioned in groove 51 so that the actuator 61 of the switch is positioned to be engaged at a selected time by the tip section 37 of arm 30, with such engagement serving to depress actuator 61 of the switch to cause movable switch contact 60 to electrically connect both poles of the switch and electrically connect leads 29 and 57 for the period of such engagement.

While the invention has been described in terms of a timer control for a defrosting system, the invention is suited for control of any system which requires electrical cylindrical control over a time period, with provisions to adjust the period of the controlled time over a uniform timed cycle.

Since obvious changes may be made in the specific embodiment of the invention described herein, such modifications being within the spirit and scope of the invention claimed, it is indicated that all matter container herein is intended as illustrative and not as limiting in scope.

Having thus described the invention, what I claim as new and desire to secure by Letters Patent of the United States is:

1. A clock timer unit which may be adjustably set to control the actuation of an electrical circuit for a fixed duration of time for each period of clock operation, comprising a clock face, marked with time indicia, a clock unit including a motor having a rotatable output shaft, an arm overlying the clock face and having an end coupled by a frictional coupling to the output shaft for rotation thereby, said frictional coupling permitting the arm to be manually rotated relative to the shaft for setting the arm in a selected position with relation to the time indicia marked on the clock face, the clock face provided with an annular groove concentric with the output shaft and located a predetermined radial distance therefrom, said groove located in the arc of movement of the rotatable arm so that the arm rotates over the groove, a momentary-contact type switch having a normally open contact means operated by a depressable actuator, said switch being frictionally mounted in the groove, the frictional mounting of the switch in the annular groove permitting the switch to be manually adjusted in the groove for adjusting locating the switch in a selected position with relation to the time indicia marked on the clock face, said arm formed of a plurality of arm members slidably engaged with each other to permit adjustment of the radial length of said arm, and said arm fitted with means to fasten together the arm members in a selected position of radial arm length, the free end of said arm including a shaped tip section, the transverse width of which varies along the radial axis of said tip section, said radial length of the said arm being adjustable to allow the shaped tip section thereof to overlie the groove in such a manner that a selected width portion of the shaped tip section is circumferentially aligned with the switch actuator so as to engage the actuator to depress said actuator to close the normally open contact means of the switch when the arm is rotated into a radial orientation with the switch, and for a duration of time proportional to the transverse width of the selected portion of the shaped tip section circumferentially aligned with the depressable switch actuator.

2. A clock timer as recited in claim 1 in which the contact means of the switch is adapted to be connected in series with electrical heater means of a vehicle.

* * * * *